United States Patent [19]

Day et al.

[11] 4,047,103
[45] Sept. 6, 1977

[54] EDDY CURRENT POSITION INDICATING APPARATUS FOR MEASURING DISPLACEMENTS OF CORE COMPONENTS OF A LIQUID METAL NUCLEAR REACTOR

[75] Inventors: Clifford K. Day; James L. Stringer, both of Richland, Wash.

[73] Assignee: Westinghouse Electric Corporation, Pittsburgh, Pa.

[21] Appl. No.: 547,074

[22] Filed: Feb. 4, 1975

[51] Int. Cl.² ............................................ G01R 33/12
[52] U.S. Cl. ............................... 324/34 D; 176/19 R
[58] Field of Search .............. 324/34 R, 34 D, 34 PS, 324/40; 176/19 R, 19 J, 19 EC; 340/195, 196, 199

[56] References Cited

U.S. PATENT DOCUMENTS

| | | | |
|---|---|---|---|
| 2,773,386 | 12/1956 | Swickard, Jr. | 340/199 |
| 3,356,933 | 12/1967 | Stettler | 340/199 |
| 3,484,678 | 12/1969 | Church | 340/199 |
| 3,891,918 | 6/1975 | Ellis | 324/34 D |
| 3,893,651 | 7/1975 | Uecker | 176/19 R |

Primary Examiner—Robert J. Corcoran
Attorney, Agent, or Firm—D. C. Abeles

[57] ABSTRACT

Apparatus for measuring displacements of core components of a liquid metal fast breeder reactor by means of an eddy current probe. The active portion of the probe is located within a dry thimble which is supported on a stationary portion of the reactor core support structure. Split rings of metal, having a resistivity significantly different than sodium, are fixedly mounted on the core component to be monitored. The split rings are slidably positioned around, concentric with the probe and symmetrically situated along the axis of the probe so that motion of the ring along the axis of the probe produces a proportional change in the probes electrical output.

11 Claims, 3 Drawing Figures

EDDY CURRENT POSITION INDICATING APPARATUS FOR MEASURING DISPLACEMENTS OF CORE COMPONENTS OF A LIQUID METAL NUCLEAR REACTOR

BACKGROUND OF THE INVENTION

The invention described herein was made in the course of, or under, a contract with the United States Atomic Energy Commission, and pertains generally to apparatus for monitoring displacements of a reactor core and more particularly to apparatus for monitoring displacements of core components immersed in the liquid metal coolant of a fast breeder reactor.

In nuclear reactors it is desirable to provide an early indication of the displacement of core components in order to avoid abnormal operating conditions. The displacement of core components is usually indicative of a failure of a core support component structure which can cause a blockage of coolant flow, resulting in a rise in core temperature to an undesirable and abnormal level. In the unlikely event of such a failure early detection can enable the plant operator to implement corrective action to avoid operating conditions which might otherwise necessitate the complete shut-down of the reactor system.

State of the art displacement sensors are generally not compatible with in-core monitoring applications for fast breeder reactors, due to the severe high temperatures and the electrically conductive and caustic nature of the sodium coolant.

For example state of the art displacement indicators applied to nuclear reactor applications such as are described in the patents to R. Wildgoose, U.S. Pat. No. 3,296,081 and J. C. Singleton, et al, U.S. Pat. No. 3,492,616, employ magnetically permeable material in combination with a movable piston/cylinder arrangement i.e. linear voltage differential transformers with a movable core, which are not particularly suitable for in-core monitoring applications. This is especially true in liquid metal reactor applications due to the caustic nature of the core environment. Adapting such transducers generally requires a bellows seal to isolate the transducer from the sodium coolant while enabling longitudinal movement of the piston. It is generally accepted that the integrity of such seals is highly susceptable to failure during the desired operating lifetime of up to 10 years. Furthermore, the high temperature experienced in the core of a fast breeder reactor severly degrades the magnetic permeability of the materials employed and thus the detectors response.

While linear differential transformer transducers have been constructed with non magnetic cores such as the transducer described in the patent to Church, U.S. No. 3,484,678, a severe problem still exists in isolating the piston from the core environment while enabling longitudinal movement of the piston shaft, which is used to translate core motion into an electrical output.

Accordingly, an improved reactor core displacement transducer is desired which does not require the use of magnetically permeable material.

Additionally, a new reactor core displacement sensor is desired which can function reliably, totally isolated from the core environment, for extended periods of operation.

Furthermore, a sensor is desired that can be easily removed from its internal core location without the necessity of dismantling the core.

SUMMARY OF THE INVENTION

Briefly, this invention provides a reactor core displacement transducer uniquely applicable to liquid metal fast breeder reactor applications. An eddy current probe having a primary and secondary winding is disposed within a dry thimble supported by a stationary portion of the reactor in the core region within the liquid metal coolant. The dry thimble houses the probe in a manner to isolate the probe from the coolant. An electrically conductive annular ring with a resistivity significantly different from that of sodium is rigidly affixed to the component of the core being monitored and is slidably positioned around the periphery of the thimble concentric with the probe. The conductive ring is arranged symmetrically along the axis of the probe so that motion of the ring along the axis of the probe produces a proportional change in the electrical output of the secondary winding.

In its preferred form the transducer of this invention includes a secondary winding having two discrete coils respectively arranged in tandem on either side of the primary winding along a common axis. The secondaries are connected in electrical opposition so that a balanced condition can be achieved when the annular ring is symmetrically situated along the axis of the primary and secondary coils. The motion of the annular ring relative to the eddy current coupled coils upsets the electrical balance, which can be calibrated to indicate the position of the split ring and hence, the position of the reactor core component monitored.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

In accordance with this invention apparatus is provided for measuring the displacement of components of a liquid metal nuclear reactor immersed in a liquid metal coolant. The active portion of the apparatus generally includes an eddy current probe having a primary and secondary winding. The probe is located within a dry thimble which is rigidly mounted on a stationary portion of the reactor core support structure. As will be appreciated from the following description the dry thimble isolates the probe from the sodium environment and readily enables the removal of the probe without disturbing the integrity of the pressure vessel. An electrically conductive annular ring, with a resistivity significantly different than sodium, is rigidly affixed to the component being monitored and slidably positioned around the periphery of the thimble concentric with the probe. The annular ring is symmetrically situated along the axis of the probe so that motion of the ring along the axis of the probe produces a proportional change in the secondary electrical output, thereby indicating relative motion of the component being monitored.

Figure 1:
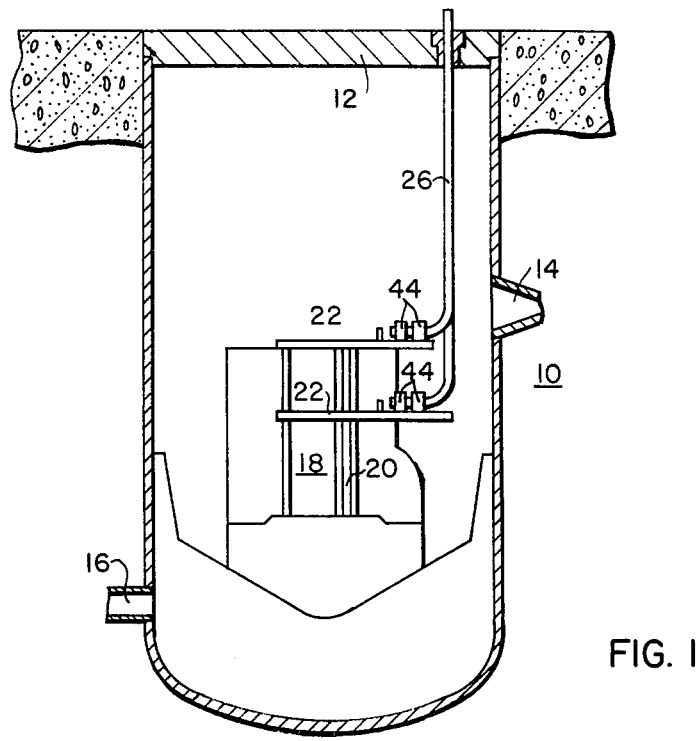
FIG. 1 is a schematic illustration of a liquid metal fast breeder reactor showing the core and core restraint structure incorporating the monitoring apparatus of this invention.
Figure 2:
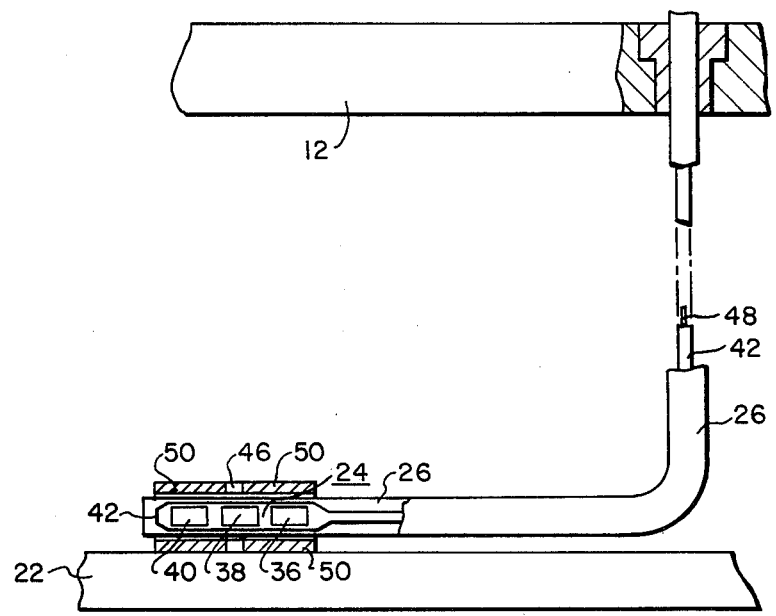
FIG. 2 is a schematic illustration of an enlarged view of the core restraint yoke incorporating the monitoring apparatus of this invention illustrated in FIG. 1.
Figure 3:
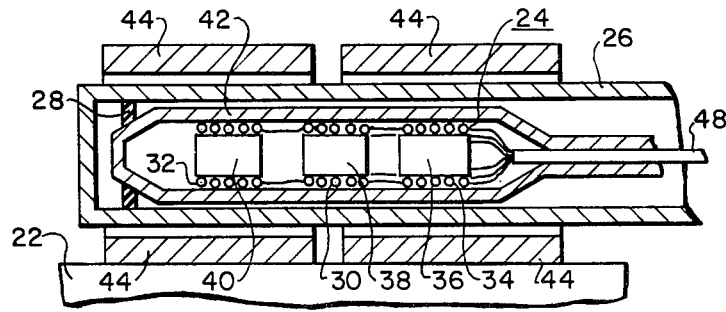
FIG. 3 is a longitudinal cross sectional view of the monitoring probe illustrated in FIG. 2.

The preferred arrangement of the apparatus of this invention for monitoring core motion is generally shown in FIG. 1 with details and alternatives illustrated in FIGS. 2 and 3. A pressurized vessel 10 of the liquid metal fast breeder reactor type is shown in FIG. 1, which forms a pressurized container when sealed by its head assembly 12. The vessel has coolant flow inlet means 16 and coolant flow outlet means 14 formed integral with and through its cylindrical walls. As is known in the art, the vessel 10 contains a nuclear core 18 consisting mainly of a plurality of clad nuclear fuel elements 20 which generate substantial amounts of heat depending primarily upon the position of control means, not shown, generally known in the art as control rods. The heat generated by the reactor core is conveyed from the core by the liquid sodium coolant flow entering through inlet means 16 and exiting through outlet means 14. Generally, though not shown, the flow exiting through outlet means 14 is conveyed through a hot leg conduit to a heat exchanger, steam generator system, wherein the heated coolant flow is conveyed through tubes which are in heat exchange relationship with water which is utilized to produce steam. This steam produced by the generator is commonly utilized to drive a turbine for the production of electricity. The flow of the liquid metal coolant is conveyed from the steam generator through a cool leg conduit to inlet means 16. Thus a closed recycling primary or steam generating loop is provided with the coolant piping coupling the vessel 10 and the steam generator. The vessel illustrated in FIG. 1 is adaptable for one such closed fluid flow system or loop, though, it should be understood that the number of such loops can vary from plant to plant, but commonly two, three or four are employed.

The flow of liquid metal coolant entering through the inlet means 16 up through the core to the outlet nozzle 14 can induce vibrations in the various core components. Furthermore, displacement of the core can occur in the unlikely event of a failure of a core support structure. Therefore, as an advance indication of such adverse operating conditions, it is advantageous to monitor changes in position of the core structural components.

The core 18, illustrated within the pressure vessel 10 of FIG. 1, is mechanically confined in position through the assistance of a plurality of core restraint yokes 22. Motion of the core will be translated through this mechanical coupling to the confining yokes. Therefore, in this preferred embodiment motion of the core restraint yokes is monitored as an indication of actual core displacement.

For example, one preferred construction of a displacement transducer contemplated by this invention which employs the principle of eddy current coupling is illustrated in FIG. 3. The active part of the probe 24 is located within a dry thimble 26 shown in section in FIG. 3. The wall protrusions 28 in the dry thimble 26 center the probe 24 in a seated position during operation. As can be better appreciated by reference to FIG. 1 the dry thimble 26 extends from its secure position, which is mounted rigidly on a stationary portion of the reactor core support structure, longitudinally upward along the axis of the pressure vessel 10 through the vessel head enclosure 12 to the exterior surroundings. Thus, the thimble 26 functions to isolate the active portion of the transducer 24 from the caustic sodium environment surrounding the core and enables ready removal of the probe from its internal reactor location without disturbing the sealed integrity of the pressure vessel 10.

In this embodiment the active probe 24 generally comprises a housing 42 which encloses a plurality of windings arranged in tandem and wound respectively around separate non-magnetic cores. More specifically, two separate secondary windings 32 and 34 would respectively around corresponding non-magnetic cores 40 and 36 are positioned symmetrically on either side of a primary winding 30, similarly wound around a non-magnetic core 38. An electrically conductive annular ring 44 with an electrical resistivity significantly different than sodium is rigidly affixed to the component being monitored 22 (shown in FIGS. 1 and 2) and slidably positioned around the periphery of the thimble 26 concentric with the probe. The conductive ring 44 is symmetrically arranged along the axis of the probe so that motion of the ring along the axis of the probe produces a proportional change in the secondary winding electrical output. In the specific embodiment illustrated in FIG. 3 the conductive annular ring is formed from split rings of metal mounted on the movable portion of the core restraint system as illustrated in FIGS. 1 and 3, so that in its neutral position as illustrated in FIG. 3, substantially equal electromagnetic coupling is achieved between the primary winding 30 and the respective secondary windings 32 and 34.

During operation, the primary winding is adapted to be excited by an electrical source of less than 1 KHz and current flow in the primary coil 30 produces an electromagnetic field that penetrates the probe housing 42, the protective thimble 26, and the sodium coolant within the reactor core to set up eddy currents in the coaxial ring 44. The eddy currents in turn establish a component of current flow in the secondary coils 32 and 34. Though not actually shown, each of the coils are coupled to the exterior of the reactor through the probe housing and the secondary coils are connected in electrical opposition. As will be well appreciated by those skilled in the art a balanced condition can be achieved when the split rings 44 are symmetrically situated about the primary and secondary coils.

Motion of the split ring relative to the eddy current coils upsets the electrical balance which can be calibrated to indicate the position of the split ring, and hence, the position of the reactor core restraint system.

FIG. 2 shows an enlarged portion of a core restraint yoke 44 illustrating an alternative design 50 for the electrically conductive annular ring. The probe 24 is shown having the electrical leads from the three tandem coils extending through the protective tubing 26 to the exterior of the reactor where they can be coupled to the external measuring instrumentation. The modified design of the annular ring 50 includes an annular sealed cavity 46 which is preferably filled with a relatively electrically non-conducting medium such as an inert gas. The cavity is longitudinally centered along the axis of revolution of the ring and establishes an electrical resistivity discontinuity along the longitudinal length of the ring which enhances the electrical imbalance between the primary and secondary windings when the annular ring is displaced from its normal position.

Accordingly, the dry thimble enables easy replacement of the probe without disturbing the sealed integrity of the reactor pressure vessel, and isolates the transducer from the caustic sodium environment. Furthermore, the concentric annular ring, constructed from a material having a resistivity significantly different than sodium, enables effective eddy current coupling without necessitating bellows seal arrangement which had to be provided in linear differential transformer transducers of prior art designs. Additionally, the apparatus of this invention avoids the necessity of applying magnetic materials which are severely, adversely affected by the caustic sodium environment and high temperatures encountered in breeder reactor applications.

We claim as our invention:

1. Apparatus for measuring displacements of a component of a liquid metal nuclear reactor immersed within the liquid metal coolant comprising:
    an eddy current probe having a primary and secondary winding,
    a dry thimble, adapted to be supported by a stationary portion of the reactor within the liquid metal coolant, housing the eddy current probe, which is stationarily supported therein during operation of the probe, and isolating the probe from the coolant, and
    an electrically conductive annular ring with resistivity significantly different than the liquid metal coolant rigidly affixed to the component being monitored and slidably positioned around the periphery of the thimble concentric with the probe and symmetrically situated along the primary and secondary windings of the probe so that motion of the ring along the probe produces a proportional change in current in the secondary winding electrical output and wherein the annular ring includes a resistivity discontinuity formed from a cavity within the ring filled with a substance having a resistivity significantly different from the annular ring and the liquid metal coolant.

2. The apparatus of claim 1 wherein the annular ring is structurally unconnected to the probe.

3. The apparatus of claim 1 wherein the dry thimble comprise a tubular conduit which extends into the liquid metal coolant of the reactor and encases the probe which is slidably mounted therein, with the wall of the conduit interposed between the probe and ring and constructed to isolate the probe from the liquid metal coolant of the reactor, the conduit path being arranged to enable removal of the probe from the liquid.

4. The apparatus of claim 1 wherein the ring is constructed with the electrical resistivity discontinuity along its axis of movement.

5. The apparatus of claim 4 wherein the cavity 6 sealed and filled with an inert gas which forms the resistivity discontintuity.

6. The apparatus of claim 1 wherein, the primary winding is adapted to be excited by an electrical source of less than 1KHz.

7. The apparatus of claim 1 wherein the secondary winding includes first and second discrete coils arranged in tandem with the primary winding and respectively positioned on either side of the primary winding along a common axis which coincides with the axis of movement of the annular ring.

8. The apparatus of claim 1 wherein the primary and secondary windings are wound around a non-magnetic core.

9. A liquid metal reactor core component displacement monitor comprising:
    an eddy current probe having a primary winding and first and second secondary coils symmetrically positioned on either side of the primary winding along a common axis, the probe being stationarily supported within the liquid metal reactor coolant proximate the core; and
    an electrically conductive annular ring having a resistivity significantly different than the liquid metal coolant of the reactor rigidly coupled to the core and slidably mounted around the periphery of the probe in a manner to effect electromagnetic coupling between the primary and the first and second secondary coils with the efficiency of the coupling dependent upon the axial location of the ring between the first and second secondary coils and wherein the annular ring includes a resistivity discontinuity formed from a cavity within the ring filled with a substance having a resistivity significantly different from the annular ring and the liquid metal coolant.

10. The displacement monitor of claim 9 including a tubular conduit extending from the exterior of the reactor into the reactor core region and enclosing the probe which is slidably mounted therein with the wall of the conduit interposed between the probe and the ring and constructed to isolate the probe from the liquid metal coolant of the reactor, the conduit path is arranged to enable removal of the probe from the reactor.

11. The displacement monitor of claim 9 wherein the primary and secondary windings of the probe are wound around a non-magnetic core.

* * * * *